United States Patent [19]

Horiuchi et al.

[11] Patent Number: 4,624,107

[45] Date of Patent: Nov. 25, 1986

[54] HYDRAULIC PRESSURE SOURCE DEVICE FOR HYDRAULIC BOOSTER OF AUTOMOBILE

[75] Inventors: Makoto Horiuchi, Maruko; Yoshitaka Miyakawa, Kawagoe, both of Japan

[73] Assignees: Nissin Kogyo Kabushiki Kaisha, Ueda; Honda Giken Kogyo Kabushiki Kaisha, Tokyo, both of Japan

[21] Appl. No.: 776,267

[22] Filed: Sep. 16, 1985

[30] Foreign Application Priority Data

Sep. 27, 1984 [JP] Japan .................................. 59-202565

[51] Int. Cl.⁴ .............................................. B60T 13/00
[52] U.S. Cl. ..................................... 60/547.1; 60/418
[58] Field of Search .................. 60/545, 547.1, 547.2, 60/547.3, 582, 418

[56] References Cited

U.S. PATENT DOCUMENTS 4,387,783  6/1983  Carman ................................ 60/418

*Primary Examiner*—Carroll B. Dority, Jr.

*Attorney, Agent, or Firm*—Armstrong, Nikaido, Marmelstein & Kubovcik

[57] ABSTRACT

A hydraulic pressure source device for supplying an actuating hydraulic pressure to an automotive booster, having an accumulator and a hydraulic pump, the pump being interposed in a low-pressure oil passage leading from the control valve of a hydraulic power steering device to an oil tank. In the oil passage is also interposed an electromagnetic valve which is adapted to be opened and closed under control of an intermittent actuator which intermittently energizes the electromagnetic valve when sensing a pressure in the accumulator below a preset level. The pump is actuated by the hydraulic oil which is discharged into the low-pressure oil passage after having actuated the control valve through intermittent opening and closing operation of the electromagnetic valve to replenish the accumulator with the hydraulic pressure. A restrictor may be disposed in the low-pressure oil passage to release the hydraulic oil to an oil tank when the electromagnetic valve is closed, so as to establish a pressure difference between the low-pressure oil passage and a high-pressure oil passage connecting between the control valve and a main hydraulic pump.

4 Claims, 2 Drawing Figures

HYDRAULIC PRESSURE SOURCE DEVICE FOR HYDRAULIC BOOSTER OF AUTOMOBILE

BACKGROUND OF THE INVENTION

1. Field of the Invention

The present invention relates to hydraulic pressure source device for a hydraulic booster which is employed to actuate, for example, an automotive brake by means of boosted oil pressure.

2. Description of Prior Art

A conventional hydraulic pressure source device for a hydraulic booster has heretofore been arranged such that hydraulic pump which employs an engine as its drive source and an accumulator which is connected to the discharge side of the pump are connected to an oil supply passage which connects an input hydraulic chamber of the booster and an oil tank.

In these days, many types of automobiles are equipped with a hydraulic power steering device. Such a power steering device has as its hydraulic pressure source a hydraulic pump which is actuated by an engine. If this automobile is equipped with a hydraulic booster of the type described above, it is necessary for a hydraulic pump for the power steering device and a hydraulic pump for the booster to be connected to the engine through respective transmission gears. It is therefore necessary to provide two transmission gears, which disadvantageously involves an increase in cost as well as increased losses of the engine power.

SUMMARY OF THE INVENTION

The present invention is proposed in view of the above-described fact and has as its primary object the provision of a hydraulic pressure source device of the above-described type wherein an auxiliary hydraulic pump for the hydraulic booster is actuated by means of oil pressure discharged from a control valve associated with a power steering device which is driven by the automotive engine, thereby overcoming the above-described disadvantages of the prior art.

To this end, according to a first aspect of the invention, there is provided a hydraulic pressure source device for a hydraulic booster of an automobile including a hydraulic power steering device provided with a control valve, the control valve of the power steering device being connected via a high-pressure oil passage to a main hydraulic pump driven by an engine, the hydraulic pressure source device comprising:

an auxiliary hydraulic pump having a working chamber and a pump chamber, the working chamber communicating with a low-pressure oil passage which connects the control valve with an oil tank, the pump chamber being adapted to perform repeated suction and discharge strokes in response to intermittent supply of an oil pressure to the working chamber;

a suction valve connecting the pump chamber to the oil tank;

a discharge valve connecting the pump chamber to an input hydraulic pressure chamber of a hydraulic booster;

an accumulator connected to a downstream side of the discharge valve;

an electromagnetic valve interposed in the low-pressure oil passage at a position downstream of the auxiliary hydraulic pump for opening and closing the low-pressure oil passage; and an intermittent actuator connected to the electromagnetic valve to actuate the valve so as to be periodically opened and closed when a pressure within the accumulator goes down below a predetermined value.

According to a second aspect of the present invention, there is provided, additionally to the above arrangement, with a restrictor which is adapted to allow the low-pressure oil passage to be conductive even when the electromagnetic valve is closed.

When the internal pressure in the accumulator goes below a specified value, the intermittent actuator causes the electromagnetic valve to be periodically opened and closed. When the valve is closed, the outlet pressure of the control valve of the power steering device rises, thus causing the auxiliary hydraulic pump to effect a discharge operation. On the other hand, when the electromagnetic valve is opened, the outlet pressure of the control valve lowers, and the auxiliary hydraulic pump consequently performs a suction operation.

The pressure of oil which is discharged from the auxiliary hydraulic pump as the result of the repetition of such operations of this pump is stored in the accumulator and employed to actuate the hydraulic booster.

The restrictor which operates to make the low-pressure oil passage conductive allows proper discharge of the working oil from the control valve even when the electromagnetic valve is closed so as to prevent disappearance of a difference in pressure between the high- and low-pressure oil passages.

DETAILED DESCRIPTION OF PREFERRED EMBODIMENTS

Embodiments of the present invention will be described hereunder with reference to the accompanying drawings.

Figure 1:
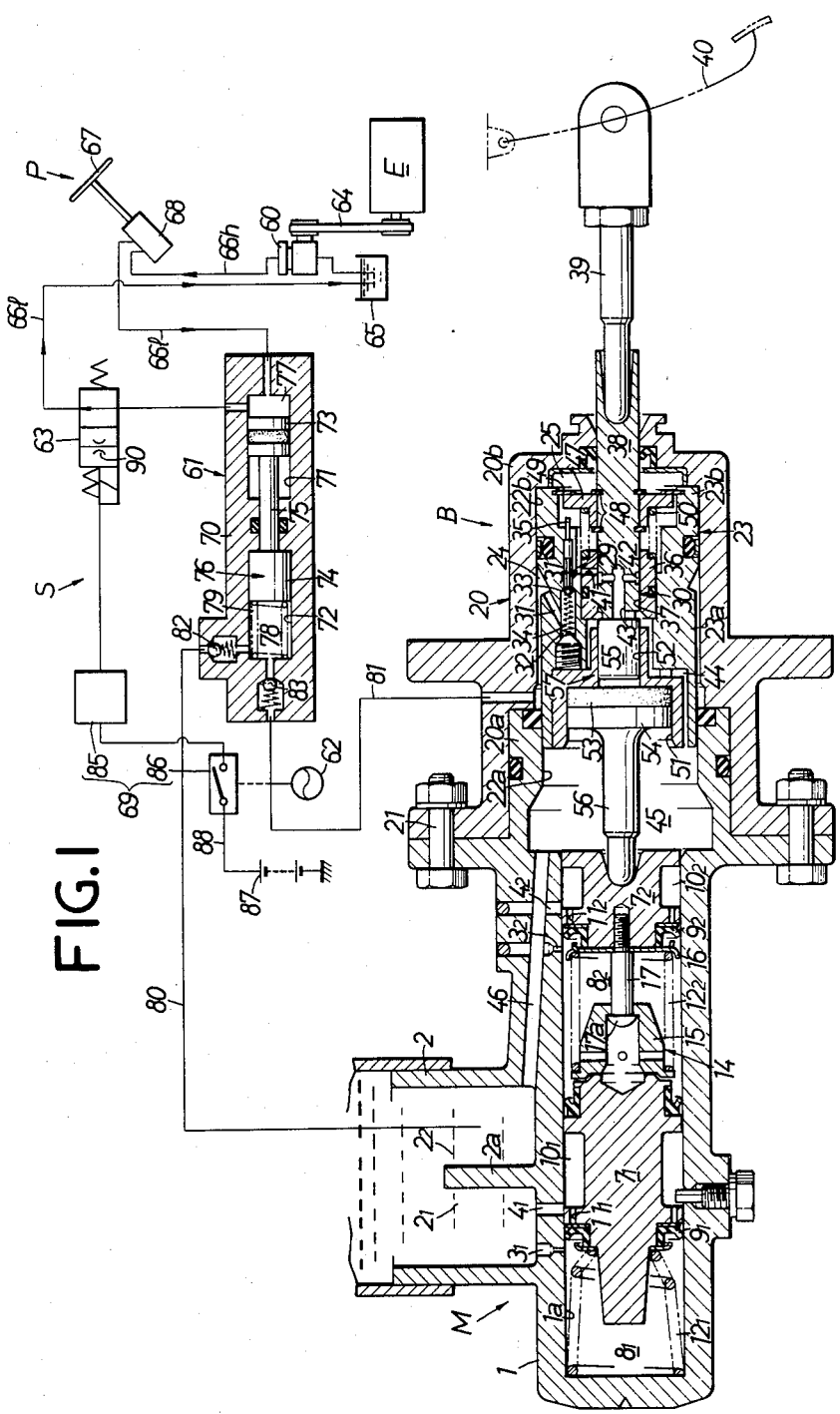
FIG. 1 is a vertical sectional side elevational view of one embodiment of the present invention.

FIG. 1 shows a first embodiment of the invention, in which are illustrated a tandem type master cylinder M for a dual type hydraulic brake of an automobile and hydraulic booster B adapted to actuate the master cylinder M by means of boosted hydraulic pressure.

In FIG. 1, the master cylinder M includes a cylinder body 1 having an oil tank 2 formed on an upper side of the body. The inside of the tank 2 is divided at a lower-half part thereof by a partition wall $2a$ into a front oil reservoir $2_1$ and a rear oil reservoir $2_2$. These oil reservoirs $2_1$ and $2_2$ communicate with a cylinder bore $1a$ formed in the cylinder body 1 through respective front relief ports $3_1$, $3_2$ and respective rear supply ports $4_1$, $4_2$. The cylinder bore $1a$ has a front piston $7_1$ and a rear piston $7_2$ slidably received therein.

In the cylinder bore $1a$, a front hydraulic pressure chamber $8_1$ is defined between the front piston $7_1$ and the front end wall of the bore $1a$, and a rear hydraulic pressure chamber $8_2$ between both the pistons $7_1$ and $7_2$. These hydraulic pressure chambers $8_1$ and $8_2$ respectively communicate with hydraulic circuits of the dual type hydraulic brake through output ports, not shown. The pistons $7_1$ and $7_2$ are mounted with piston cups $9_1$ and $9_2$ disposed at their front ends respectively. The pistons $7_1$ and $7_2$ have their intermediate portions reduced in diameter to form annular oil replenishing chambers $10_1$ and $10_2$ on their outer peripheries. The oil chambers $10_1$ and $10_2$ respectively communicate with the back portions of the piston cups $9_1$ and $9_2$ via through-holes $11_1$ and $11_2$ which are provided at the respective front end portions of the pistons $7_1$ and $7_2$.

In the front hydraulic pressure chamber $8_1$ is housed a front return spring $12_1$ which biases the front piston $7_1$ in its retracting direction, while in the rear hydraulic pressure chamber $8_2$ is disposed a rear return spring $12_2$ which biases the rear piston $7_2$ in its retracting direction and a distance maintaining device 14 which limits stretching of the spring $12_2$ within a predetermined range. The distance maintaining device 14 comprises a pair of movable and fixed (front and rear) seat members 15 and 16 which respectively retain both ends of the rear return spring $12_2$, and a support shaft 17 which is mounted on the rear piston $7_2$ and slidably carries the movable seat member 15. The support shaft 17 has an expanded head portion 17a which serves to limit the forward movement of the movable seat member 15. Accordingly, the support shaft 17 allows the movable seat member 15 to approach the rear piston $7_2$ but by means of its expanded head portion 17a prevents the movable seat member 15 from separating from the rear piston $7_2$ by more than a predetermined distance, thereby regulating the maximum distance between the movable seat member 15 and the rear piston $7_2$, and this regulation provides a limitation to the stretching of the return spring $12_2$.

A booster cylinder 20 of the hydraulic booster B is continuously formed with the rear part of the cylinder body 1 of the master cylinder M. The booster cylinder 20 comprises a smaller-diameter cylinder 20a which is formed integrally with the cylinder body 1 so as to project from the rear end of the body, and a larger-diameter cylinder 20b which is secured to the rear end of the cylinder body 1 by bolts 21 and extends rearwardly of the smaller-diameter cylinder 20a while covering the same. A cylinder bore 22b of the larger-diameter cylinder 20b is made larger in diameter than a cylinder bore 22a of the smaller-diameter cylinder 20a and is disposed rearwardly of the latter.

The booster cylinder 20 has a booster piston 23 slidably received therein. The extremity of the rearward movement of the booster piston 23 is limited by the rear end wall of the larger-diameter cylinder 20a. The booster piston 23 has a smaller-diameter portion 23a slidably received in the front cylinder bore 22a and a larger-diameter portion 23b slidably received in the rear cylinder bore 22b. The inside of the rear cylinder bore 22b is divided by the larger-diameter portion 23b into a front input hydraulic pressure chamber 24 and a rear output hydraulic pressure chamber 25. The output hydraulic pressure chamber 25 is, as a matter of course, larger than the input hydraulic pressure chamber 24 in terms of pressure-receiving area. The hydraulic pressure source device S according to the present invention is connected to the input hydraulic pressure chamber 24.

The booster piston 23 has an inlet valve 29 and an outlet valve 30 disposed side by side.

The inlet valve 29 is of normally-closed type and comprises: a tubular valve chamber 32 formed axially of the booster piston 23 at an intermediate portion of an oil passage 31 which provides communication between the input and output hydraulic pressure chambers 24 and 25; a spherical valve body 33 adapted to open and close the oil passage 31 in cooperation with a valve seat which is formed on the rear end wall of the valve chamber 32; a valve spring 34 disposed within the valve chamber 32 so as to bias the valve body 33 in its closing direction; and an actuator rod 35 capable of moving the valve body 33 in its opening direction against the force of the valve spring 34. The actuator rod 35 is fitted in the booster piston 23 in a manner slidable in the axial direction of the piston 23, the rear end portion of the rod 35 projecting into the output hydraulic pressure chamber 25.

The outlet valve 30 comprises a valve cylinder 36 which is fitted in the piston 23 so as to extend axially of the piston 23, and a valve piston 38 which is slidably received in an inner bore, that is, a valve bore 37, of the valve cylinder 36. The rear end portion of the valve piston 38 extends oil-tightly through the rear end wall of the booster cylinder 20 and is connected to a brake pedal 40 through a push rod 39. The valve cylinder 36 has an outlet port 41 communicating with the output hydraulic pressure chamber 25, while the valve piston 38 has an annular groove 42 which comes in and out of communication with the outlet port 41 in response to the forward and rearward movements of the valve piston 38, and also has an oil passage 43 which communicates with the annular groove 42. The oil passage 43 communicates with an oil chamber 45, defined in front of the booster piston 23, through an oil passage 44 which is formed in the booster piston 23. Further, the oil chamber 45 communicates with the rear oil reservoir $2_2$ in the oil tank 2 through an oil passage 46 which is formed in the cylinder body 1. The oil passage 46 also provides communication between the rear oil reservoir $2_2$ on one hand and the relief port $3_2$ and the supply port $4_2$ on the other.

In the output hydraulic pressure chamber 25, an interlocking plate 47 is secured to the valve piston 38 by means of a pair of front and rear circlips 48. The interlocking plate 47 faces the rear end of the actuator rod 35 of the inlet valve 29 so as to push the rod 35 forwardly in response to the forward movement of the valve piston 38. The interlocking plate 47 further serves to limit the extremity of rearward movement of the valve piston 38 in cooperation with a stopper ring 49 which is attached to the booster piston 23. The interlocking plate 47 is biased in the direction to abut against the stopper ring 49 by means of the force of a return spring 50 compressed between the valve cylinder 36 and the plate 47.

The booster piston 23 is formed with a larger-diameter bore 51 which opens to the front of the booster piston 23, and a smaller-diameter bore 52 which extends from the larger-diameter bore 51 to the valve bore 37. In the larger-diameter bore 51, an elastic piston 53 of rubber and a pressure-receiving piston 54 with the same diameter as that of the piston 53 are slidably received in the mentioned order. On the other hand, the smaller-diameter bore 52 slidably receives a reaction piston 55 which is able to abut at both its ends against the respective surfaces of the valve piston 38 and the elastic piston 53.

The pressure-receiving piston 54 has an output rod 56 projecting from its front side and abutting against the rear end of the rear piston $7_2$.

In the above-described arrangement, the pressure-receiving piston 54, the elastic piston 53 and the reaction piston 55 constitute in combination a reaction mechanism 57 which transmits the reaction force as the result of the action of the master cylinder M to the piston 38.

Thus, when the brake pedal 40 is in an inoperative state, the valve piston 38, together with the interlocking plate 47, is, as illustrated, maintained at the extremity of the rearward movement thereof by means of the force of the return spring 50, and the annular groove 42 is placed at the position where it is in communication with the outlet port 41. The outlet valve 30 is therefore open. In the inlet valve 29, on the other hand, the actuator rod 35 is released from the interlocking plate 47, and the valve body 33 is caused to be seated on the valve seat of the valve chambers 32 by means of the force of the valve spring 34. For the reason, the inlet valve 29 is closed. Accordingly, the input and output hydraulic pressure chambers 24 and 25 are shut off from each other by the inlet valve 29, and the output hydraulic pressure chamber 25 is communicated with the oil tank 2 through the outlet port 41, the annular groove 42, the oil passages 43, 44, the oil chamber 45 and the oil passage 46 and is therefore under atmospheric pressure. In consequence, the front and rear pistons $7_1$, $7_2$ and the booster piston 23 are maintained at the extremities of their respective rearward movements by the urging force of the return springs $12_1$ and $12_2$.

Further, in this case, the oil pressure accumulated in an accumulator 62, described later, of the hydraulic pressure source device S has been introduced into the input hydraulic pressure chamber 24 and acts on the front surface of the larger-diameter portion 23b of the booster piston 23, which also allows the booster piston 23 to be maintained at the extremity of its rearward movement. Further, since the spherical valve body 33 has a high valve closing ability, it is possible for it to reliably prevent any leakage of hydraulic oil from the input hydraulic pressure chamber 24 into the output hydraulic pressure chamber 25.

As the brake pedal 40 is pressed for the purpose of braking the automobile, its depression causes the valve piston 38 and the interlocking plate 47 to be pushed forwardly through the push rod 39. Thereupon, the annular groove 42 is first shut off from the outlet port 41, that is, the outlet valve 30 is closed. Then, the interlocking plate 47 abuts against the rear end of the actuator rod 35 and pushes the same forwardly, whereby the valve body 33 is separated from the valve seat, that is, the inlet valve 29 is opened. As a result, the output hydraulic pressure chamber 25 is out of communication with the oil tank 2, and the hydraulic pressure which has been introduced in the input hydraulic pressure chamber 24 is also introduced into the output oil hydraulic chamber 25 through the oil passage 31 and the valve chamber 32. In consequence, the booster piston 23 which receives the hydraulic pressure at its rear surface is moved forwardly, thus causing the front and rear pistons $7_1$ and $7_2$ to move forwardly through the reaction mechanism 57 and the output rod 56 while compressing their respective return springs $12_1$ and $12_2$. Then, after the piston cups $9_1$ and $9_2$ have respectively passed the relief ports $3_1$ and $3_2$, the pistons $7_1$ and $7_2$ respectively cause hydraulic pressures to be produced in the hydraulic pressure chambers $8_1$ and $8_2$ in response to the respective forward movements of the pistons $7_1$ and $7_2$, thereby allowing the corresponding brake hydraulic circuits to be actuated.

In the meantime, the pressure-receiving piston 54 receives from the rear piston $7_2$ the reaction force created by the action of the master cylinder M and is thereby actuated so as to compress the elastic piston 53. A part of the compressing force is fed back to the valve piston 38 through the reaction piston 55 and further to the brake pedal 40 through the push rod 39, whereby it is possible for the driver of the automobile to sense the magnitude of the braking force.

The hydraulic pressure source device S according to the present invention will now be described.

The device S comprises: a main hydraulic pump 60 of a hydraulic power steering device P; an auxiliary hydraulic pump 61 which is actuated by the main hydraulic pump 60; an accumulator 62 in which hydraulic pressure is accumulated by the operation of the auxiliary hydraulic pump 61; an electromagnetic valve 63 which controls the operation of the auxiliary hydraulic pump 61; and an intermittent actuator 69 which controls the electromagnetic valve 63.

The main hydraulic pump 60 is actuated by an engine E through a transmission device 64 so as to feed the working oil pumped up from an oil tank 65 to a high-pressure oil passage 66h under pressure. The working oil fed to the high-pressure oil passage 66h is passed to a low-pressure oil passage 66l via a control valve 68 which is operated through a steering wheel 67 and then returns to the oil tank 65. When the control valve 68 is operated through the steering wheel 67, the hydraulic pressure in the high-pressure oil passage 66h is supplied to a power cylinder (not shown), whereby the power cylinder is actuated so as to assist the driver in operating the steering wheel 67. The power steering device P of the type described above is known.

The auxiliary hydraulic pump 61 comprises a pump body 70 which has first and second cylinder bores 71 and 72 defined therein in series, and a piston assembly 76 which is composed of first and second pistons 73 and 74 which are slidably received in the respective cylinder bores 71 and 72 and interconnected through a piston rod 75. In the first cylinder bore 71, the first piston 73 defines a working chamber 77 on its front side, while, in the second cylinder bore 72, the second piston 74 defines a pump chamber 78 on its front side. In the pump chamber 78 is compressed a return spring 79 in such a manner as to bias the piston assembly 76 toward the working chamber 77.

The working chamber 77 is connected with the low-pressure oil passage 66l in such a manner that the working oil in the low-pressure oil passage 66l passes through the working chamber 77. On the other hand, the pump chamber 78 is connected through a suction valve 82 with a suction oil passage 80 which extends from the oil tank 2 of the master cylinder M or an independent oil tank. The pump chamber 78 is further connected through a discharge valve 83 with a dischage oil passage 81 which leads to the input hydraulic pressure chamber 24 of the hydraulic booster B. Further, the accumulator 62 is connected to the discharge oil passage 81.

Figure 2:
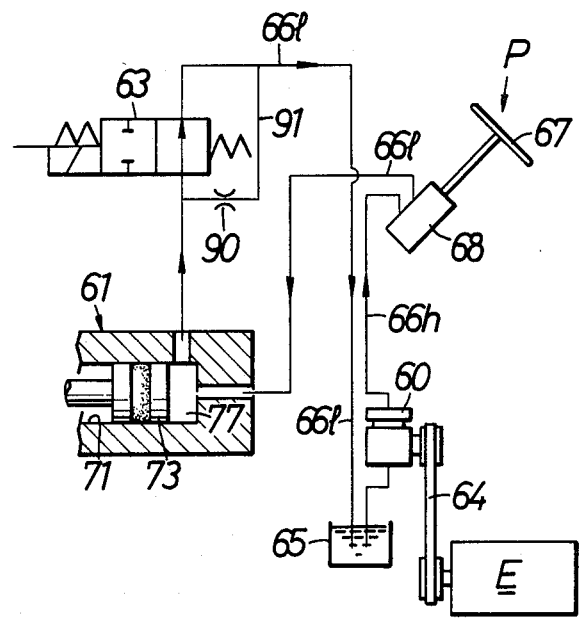
FIG. 2 is a hydraulic circuit diagram which shows only an essential part of another embodiment of the present invention.

The electromagnetic valve 63 is interposed in the low-pressure oil passage 66l on the downstream side of the auxiliary hydraulic pump 61. The valve 63 is formed in a normally-open type valve which is closed when excited. The low-pressure oil passage 66l is further provided therein with a restrictor 90 which allows the oil passage 66l to be conductive even when the electromagnetic valve 63 is closed. The restrictor 90 may be provided integrally on the electromagnetic valve 63 itself in such a manner that the restrictor 90 communicates with the low-pressure oil passage 66l when the electromagnetic valve 63 is closed, as shown in FIG. 1. Alternatively, the restrictor 90 may be separately disposed in a by-pass passage 91 which is connected to the low-pressure oil passage 66*l* so as to by-pass the electromagnetic valve 63, as shown in FIG. 2.

The intermittent actuator 69 is constituted by an oscillator 85 and a pressure-responsive switch 86.

The oscillator 85 is interposed in an energization circuit 88 which connects a power source 87 to the solenoid of the electromagnetic valve 63. The oscillator 85 is adapted to deliver periodical actuating pulses to the electromagnetic valve 83 during energization.

To control the energization of the oscillator 85, the pressure-responsive switch 86 is inserted into the energization circuit 88, the switch 86 being adapted to be closed when sensing that the internal pressure of the accumulator 62 goes below a specified value.

The following is a description of the operation of the above-described embodiment.

Assuming now that the internal pressure of the accumulator 62 goes below the specified value, the pressure-responsive switch 86 is closed. Thereupon the oscillator 85 is actuated to deliver periodical actuating pulses to the electromagnetic valve 63. In consequence, the electromagnetic valve 63 repeats opening and closing operations, thereby periodically opening and closing the low-pressure oil passage 66*l*.

Thus, when the electromagnetic valve 63 is closed, the outlet pressure of the control valve 68 rises, and the pressure acts on the working chamber 77 of the auxiliary hydraulic pump 61, thus causing the piston assembly 76 to be pushed toward the pump chamber 78 against the force of the return spring 79. In consequence, the pump chamber 78 is pressurized. More specifically, the pump chamber 78 carries out a discharge stroke in which the working oil inside the pump chamber 78 is fed under pressure to the discharge oil passage 81 through the discharge valve 83.

Even when the electromagnetic valve 63 is thus closed, the low-pressure oil passage 66*l* is maintained in a conductive state through the restrictor 90. Accordingly, discharge of the working oil from the control valve 68 to the oil tank 65 is permitted to a proper degree. As a result, there is no risk of disappearance of a differential pressure between the high- and low-pressure oil passages 66*h* and 66*l*. It is therefore possible to ensure a reliable operation of the power steering device P during a steering operation, and there is no large change in the operation feeling when the driver actuates the steering wheel 67.

When the electromagnetic valve 63 is opened, the piston assembly 76 is pushed back in the auxiliary hydraulic pump 61 toward the working chamber 77 by means of the force of the return spring 79. In consequence, the pressure in the pump chamber 78 is reduced. More specifically, the pump chamber 78 effects a suction stroke in which the oil stored in the oil tank 2 is sucked into the pump chamber 78 through the suction oil passage 80.

By virtue of such a pump operation of the auxiliary hydraulic pump 61, the hydraulic pressure for actuating the hydraulic booster B is accumulated in the accumulator 62. When the hydrualic pressure accumulated in the accumulator 62 exceeds a specified value, the pressure-responsive switch 86 is opened, and the operation of the oscillator 85 is thereby suspended. In consequence, the electromagnetic valve 63 returns to its open state.

As has been described above, according to the first aspect of the present invention, the control valve of the hydraulic power steering device is connected through the high-pressure oil passage to the main hydraulic pump which is actuated by the engine, and the working chamber of the auxiliary hydraulic pump is communicated with the low-pressure oil passage which connects the control valve and the oil tank. The auxiliary hydraulic pump has a pump chamber in which suction and discharge strokes are repeated when the working chamber is intermittently supplied with hydraulic pressure. The pump chamber is communicated with the oil tank through the suction valve and with the input hydraulic chamber through the discharge valve. The accumulator is connected to the downstream side of the discharge valve. Further, the electromagnetic valve is interposed in the low-pressure oil passage on the downstream side of the auxiliary hydraulic pump, the electromagnetic valve being adapted to open and close the low-pressure oil passage. The electromagnetic valve is connected with the intermittent actuator which causes the electromagnetic valve to be periodically opened and closed. By virtue of this arrangement, it is possible for the auxiliary hydraulic pump for the hydraulic booster to be actuated by means of the outlet oil pressure of the control valve of the power steering device. Accordingly, it is unnecessary for the auxiliary hydraulic pump to be provided with any transmission device for connecting the pump to the engine, which advantageously contributes to reduction in the cost and power losses.

Further, according to the second aspect of the present invention, there is provided additionally to the above-described arrangement according to the first aspect of the invention with the restrictor which allows the low-pressure oil passage to be conductive even when the electromagnetic valve is closed. It is therefore possible to prevent disappearance of a differential pressure between the high- and low-pressure oil passages when the electromagnetic valve is closed. Thus, it is possible to suppress changes in the operation feeling when the driver actuates the power steering device.

What is claimed is:

1. A hydraulic pressure source device for a hydraulic booster of an automobile including a hydraulic power steering device provided with a control valve, said control valve of the power steering device being connected via a high-pressure oil passage to a main hydraulic pump driven by an engine, said hydraulic pressure source device comprising:

an auxiliary hydraulic pump having a working chamber and a pump chamber, said working chamber communicating with a low-pressure oil passage which connects said control valve with an oil tank, said pump chamber being adapted to perform repeated suction and discharge strokes in response to intermittent supply of an oil pressure to the working chamber, a suction valve connecting said pump chamber to the oil tank;

a discharge valve connecting said pump chamber to an input hydraulic pressure chamber of a hydraulic booster;

an accumulator connected to a downstream side of the discharge valve;

an electromagnetic valve interposed in said low-pressure oil passage at a position downstream of said auxiliary hydraulic pump for opening and closing the low-pressure oil passage; and an intermittent actuator connected to said electromagnetic valve to actuate the valve so as to be periodically opened and closed when a pressure within the accumulator goes down below a predetermined value.

2. A hydraulic pressure source device for a hydraulic booster of an automobile including a hydraulic power steering device provided with a control valve, said control valve of the power steering device being connected via a high-pressure oil passage to a main hydraulic pump driven by an engine, said hydraulic pressure source device comprising:

an auxiliary hydraulic pump having a working chamber and a pump chamber, said working chamber communicating with a low-pressure oil passage which connects said control valve with an oil tank, said pump chamber being adapted to perform repeated suction and discharge strokes in response to intermittent supply of an oil pressure to the working chamber, a suction valve connecting said pump chamber to the oil tank;

a discharge valve connecting said pump chamber to an input hydraulic pressure chamber of a hydraulic booster;

an accumulator connected to a downstream side of the discharge valve;

an electromagnetic valve interposed in said low-pressure oil passage at a position downstream of said auxiliary hydraulic pump for opening and closing the low-pressure oil passage;

an intermittent actuator connected to said electromagnetic valve to actuate the valve so as to be periodically opened and closed when a pressure within the accumulator goes down below a predetermined value; and a restrictor interposed in said low-pressure oil passage at a position downstream of said auxiliary hydraulic pump to place the low-pressure oil passage conductive when said electromagnetic valve is closed.

3. A device as set forth in claim 2, wherein said restrictor is integrally provided on the electromagnetic valve.

4. A device as set forth in claim 2, wherein said restrictor is disposed in a by-pass passage which by-passes the electromagnetic valve.

* * * * *